US005894963A

United States Patent [19]

Hirota

[11] Patent Number: 5,894,963

[45] Date of Patent: Apr. 20, 1999

[54] PUMP MECHANISM FOR EJECTING LIQUID

[75] Inventor: Koji Hirota, Kanazawa, Japan

[73] Assignee: Shinko Kagaku Kabushiki Kaisha, Ishikawa-ken, Japan

[21] Appl. No.: 08/969,023

[22] Filed: Nov. 12, 1997

[30] Foreign Application Priority Data

Mar. 24, 1997 [JP] Japan .................................... 9-070032

[51] Int. Cl.[6] ...................................................... G01F 11/30

[52] U.S. Cl. .................................... 222/321.2; 222/321.6; 222/321.9

[58] Field of Search ............................. 222/321.2, 321.6, 222/321.9, 341, 385

[56] References Cited

U.S. PATENT DOCUMENTS 4,762,475 8/1988 Fuchs .................................. 222/321.2

5,105,994 4/1992 Jouillat et al. ....................... 222/321.2

FOREIGN PATENT DOCUMENTS 2285815 4/1976 France .

2433982 3/1980 France .

2650342 2/1991 France .

7-250899 10/1995 Japan .

*Primary Examiner*—Philippe Derakshani

*Attorney, Agent, or Firm*—Jordan and Hamburg LLP

[57] ABSTRACT

In a pump mechanism for ejecting liquid, an upper inside wall of a bell-shaped portion which is formed around a lower end of a first piston constitutes a guide surface inclined upward toward an axial hole of the first piston. The guide surface serves to prevent entrapping of air underneath the upper inside wall of the bell-shaped portion, or in an upper part of a metering chamber and stabilize the amount of liquid measured in each successive spraying action.

5 Claims, 5 Drawing Sheets

PUMP MECHANISM FOR EJECTING LIQUID

BACKGROUND OF THE INVENTION

This invention relates to a pump mechanism for ejecting liquid which can eject a fixed amount of a given liquid, such as a liquid medicine, at a time in the form of a spray or jet.

Containers for holding a liquid medicine for nose or throat treatment, for instance, are usually provided with a built-in pump mechanism for ejecting the liquid medicine on affected parts of a human body.

As illustrated in FIG. 5, a conventional pump mechanism comprises a stationary cylinder 1 which is mounted at a mouth of a liquid medicine container, a first piston 2 and a second piston 3, both incorporated inside the stationary cylinder 1 in a coaxial configuration. The first piston 2 is slidably installed with its lower bell-shaped portion 2*b* fitted in a large-diameter portion 1*a* of the stationary cylinder 1 provided close to its upper end, while the second piston 3 is installed with its upward-directed funnel-shaped portion 3*b* fitted into a small-diameter portion 1*b* of the stationary cylinder 1. As the second piston 3 moves up and down, its upper sloping surface 3*a* closes and opens a stepped axial hole 2*c* in the first piston 2 from underneath. The second piston 3 is fitted with a tubular nonreturn valve 3*d* formed of an elastic material, such as rubber, which can close an axial hole 3*c* connected to an unillustrated intake port from outside.

As the first piston 2 is depressed by pushing an unillustrated operating nozzle unit, a mass of liquid medicine contained in a metering chamber A, which is formed between the bell-shaped portion 2*b* and funnel-shaped portion 3*b*, is forced into the axial hole 2*c* and sprayed through a nozzle chip mounted at an end of the first piston 2 in the direction of an arrow Ka as illustrated in FIG. 5. More specifically, when the first piston 2 is pressed down, the internal pressure of the metering chamber A increases and the second piston 3 is forced downward against an unillustrated spring. Consequently, the axial hole 2*c* is opened, allowing the liquid medicine to be delivered upward and sprayed through the nozzle chip. In this spraying operation, the liquid medicine contained in the metering chamber A flows into a lower space of the axial hole 2*c* through slits 2*d*1 made in a cylindrical guide 2*d* which extends downward from a lower part inside the bell-shaped portion 2*b*.

When a pressuring force applied to the first piston 2 is removed, the first piston 2 and second piston 3 return together to their upper positions with the aid of the unillustrated spring, producing a negative pressure inside the metering chamber A. This negative pressure causes another mass of liquid medicine to flow into the metering chamber A through the nonreturn valve 3*d*. With the pump mechanism thus constructed, it is possible to eject intermittent sprays of liquid medicine onto an affected part by repeatedly pressing the first piston 2.

The aforementioned conventional pump mechanism is usually mounted to the mouth of the liquid medicine container (not shown) by means of a screw cap 4 and a packing 1*f*.

One problem of the prior art technology described above is that the amount of liquid medicine ejected through the nozzle chip varies each time the first piston 2 is pressed. Since an upper inside surface 2*b*1 of the bell-shaped portion 2*b* of the first piston 2 forms a broad horizontal surface which connects to the axial hole 2*c*, air is likely to be entrapped under the upper inside surface 2*b*1 and the entrapped air would not easily be released from the internal space of the bell-shaped portion 2*b*. This is a main reason which causes the amount of liquid medicine measured by the metering chamber A to usually vary each successive press of the first piston 2.

SUMMARY OF THE INVENTION

It is an object of the present invention to provide a pump mechanism for ejecting liquid which has overcome the problems residing in the prior art.

It is another object of the present invention to provide a pump mechanism for ejecting liquid which can produce successive jets or sprays of liquid with minimal variations in the amount of liquid ejected each time a first piston is pressed.

According to an aspect of the present invention, a liquid ejecting pump mechanism comprises a stationary cylinder having a large-diameter portion in an upper part and a small-diameter portion in a lower part with an intake port formed in the small-diameter portion, a first piston formed of a hollow cylindrical member whose axial hole is reduced in diameter close to its upper end, a bell-shaped portion being formed around a lower end of the first piston, the first piston being slidably incorporated in the stationary cylinder with the bell-shaped portion held in sliding contact with an inner surface of the large-diameter portion of the stationary cylinder, a second piston incorporated in the stationary cylinder in sliding contact with its inner surface and biased upward by a spring, the second piston serving to open and close the axial hole when moved relative to the first piston in its axial direction, and a nonreturn valve mounted on the second piston. An upper inside wall of the bell-shaped portion of the first piston forms a guide surface which is inclined upward toward the axial hole.

With the liquid ejecting pump mechanism thus constructed, air will not be entrapped in an upper part of a metering chamber which is formed below the bell-shaped portion because the upper inside wall of the bell-shaped portion constitutes a guide surface inclined toward the axial hole of the first piston. In this configuration, air bubbles which have reached the upper part of the metering chamber are quickly ejected along the guide surface and through the axial hole. This ensures that the amount of liquid is exactly measured by the metering chamber each time the first piston is pressed, minimizing variations in the amount of ejected liquid throughout successive spraying actions.

These and other objects, features and advantages of the invention will become more apparent upon reading the following detailed description in conjunction with the accompanying drawings.

DETAILED DESCRIPTION OF THE PREFERRED EMBODIMENT OF THE INVENTION

Figure 1:
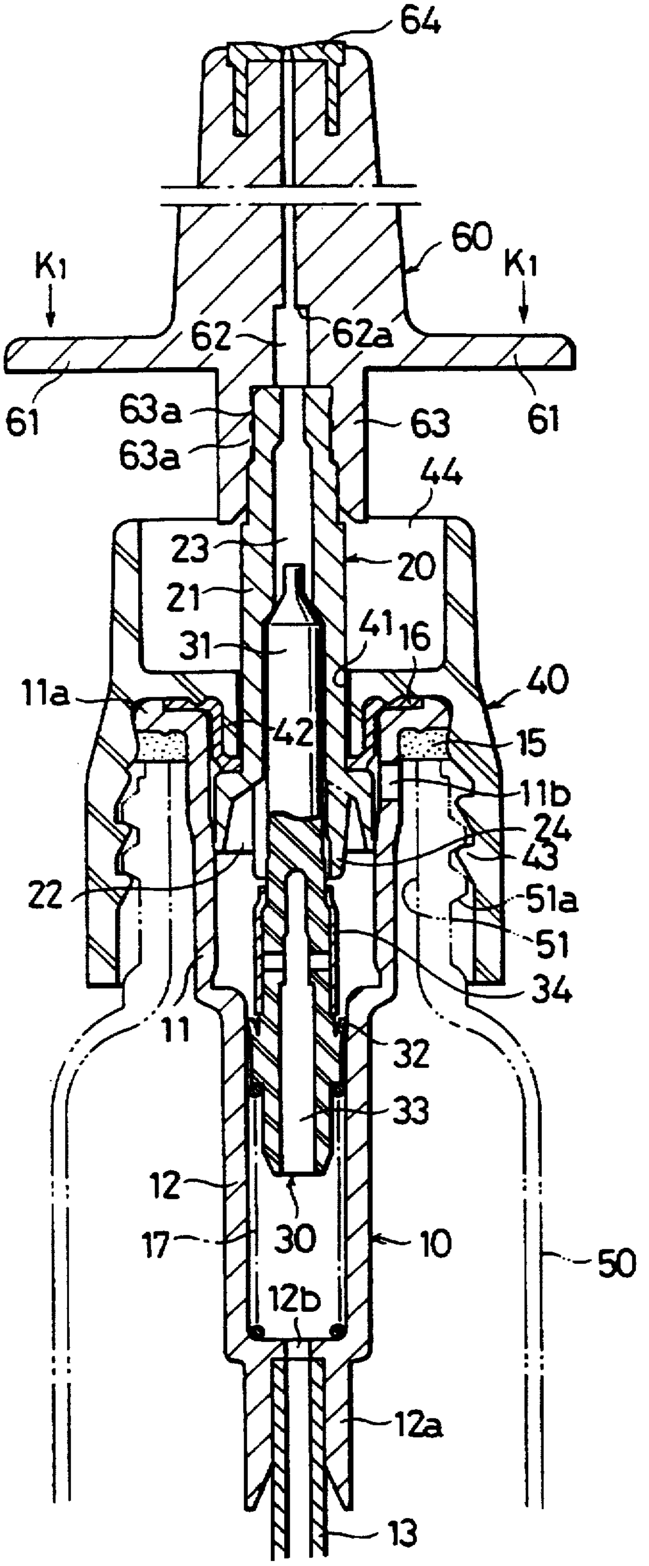
FIG. 1 is a general cross-sectional diagram illustrating a pump mechanism according to a preferred embodiment of the invention.
Figure 2:
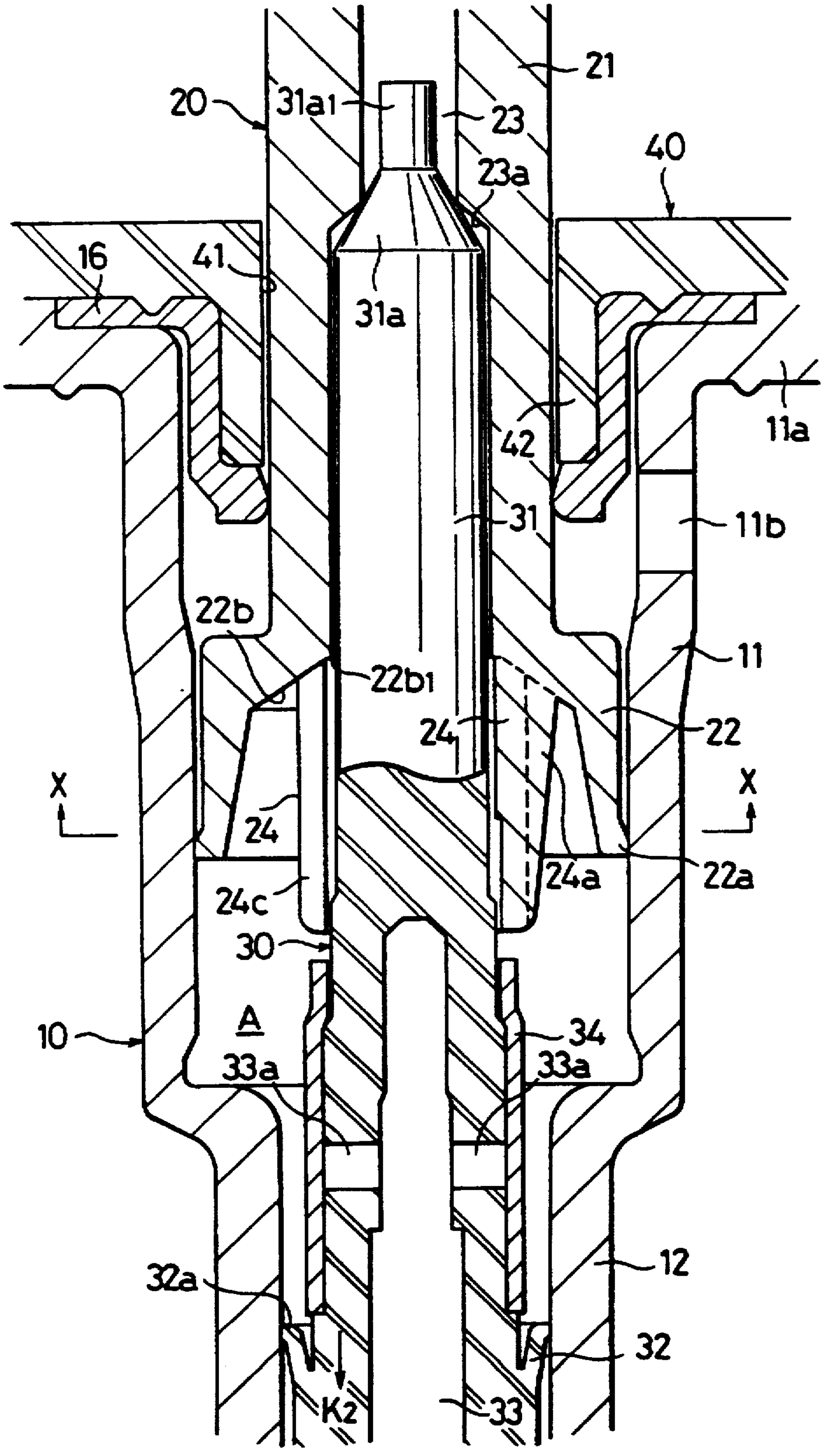
FIG. 2 is a partially enlarged cross-sectional diagram showing principal parts of the pump mechanism of FIG. 1.

A liquid ejecting pump mechanism of the invention comprises as its principal components a stationary cylinder 10, a first piston 20 and a second piston 30, both incorporated inside the stationary cylinder 10, as illustrated in FIGS. 1 and 2. The stationary cylinder 10 is mounted to a mouth 51 of a container 50 by means of a cap 40, and an operating nozzle head 60 is fitted to an upper end of the first piston 20.

External threads 51*a* are formed around the mouth 51 of the container 50. The container 50 itself is formed into such size and shape that will comfortably fit in a human hand.

The cap 40 has in its central part a through hole 41. There is formed a cylindrical sleeve 42 extending downward along the through hole 41 and the first piston 20 is vertically passed through the cylindrical sleeve 42. There are formed internal threads 43 which mate with the external threads 51*a* of the container 50 inside a lower part of the cap 40, while a large-diameter recessed cavity 44 is formed at an upper part of the cap 40.

The operating nozzle head 60 has a finger-operated flange 61 projecting laterally from approximately the middle of the operating nozzle head 60, and an axial hole 62 is formed inside the operating nozzle head 60. Formed at a lower part of the operating nozzle head 60 is a socket 63 which fits over an upper end portion of the first piston 20, with retaining ribs 63*a* formed on an inside wall of the socket 63. An upper part of the axial hole 62 is reduced in diameter with a stepped stage 62*a* formed in about the middle of the length of the axial hole 62, which connects to a nozzle chip 64 fitted to an extreme upper end of the operating nozzle head 60.

As can be seen from FIGS. 1 and 2, the aforementioned stationary cylinder 10, first piston 20 and second piston 30 are assembled together in a coaxial configuration.

Upper and lower halves of the stationary cylinder 10 constitute a large-diameter portion 11 and a small-diameter portion 12, respectively. An upper half of the large-diameter portion 11 is still increased in diameter and an air passage 11*b* is formed in the side wall of this enlarged part. The large-diameter portion 11 has a flange 11*a* extending outward at its upper end. At a lower part of the small-diameter portion 12, there is formed a socket 12*a* into which a suction tube 13 is inserted. An internal space of the socket 12*a* is connected to the inside of the small-diameter portion 12 by way of an intake port 12*b*. The suction tube 13 extends down to the bottom of the container 50.

The first piston 20 has in its upper and lower parts a shaft portion 21 and a bell-shaped portion 22, respectively. An axial hole 23 is formed within the shaft portion 21, the axial hole 23 having in the middle of its length a conical step 23*a* where the diameter of the axial hole 23 is reduced. Opening at the top of the shaft portion 21, an extreme upper end of the axial hole 23 is collected to the axial hole 62 formed in the operating nozzle head 60. The bell-shaped portion 22 fits in the large-diameter portion 11 of the stationary cylinder 10, and a sealing flange 22*a* formed around a lower end of the bell-shaped portion 22 comes into sliding contact with an inner surface of the large-diameter portion 11. With this arrangement, the first piston 20 is slidably installed with its bell-shaped portion 22 fitted into the large-diameter portion 11 of the stationary cylinder 10.

Figure 3:
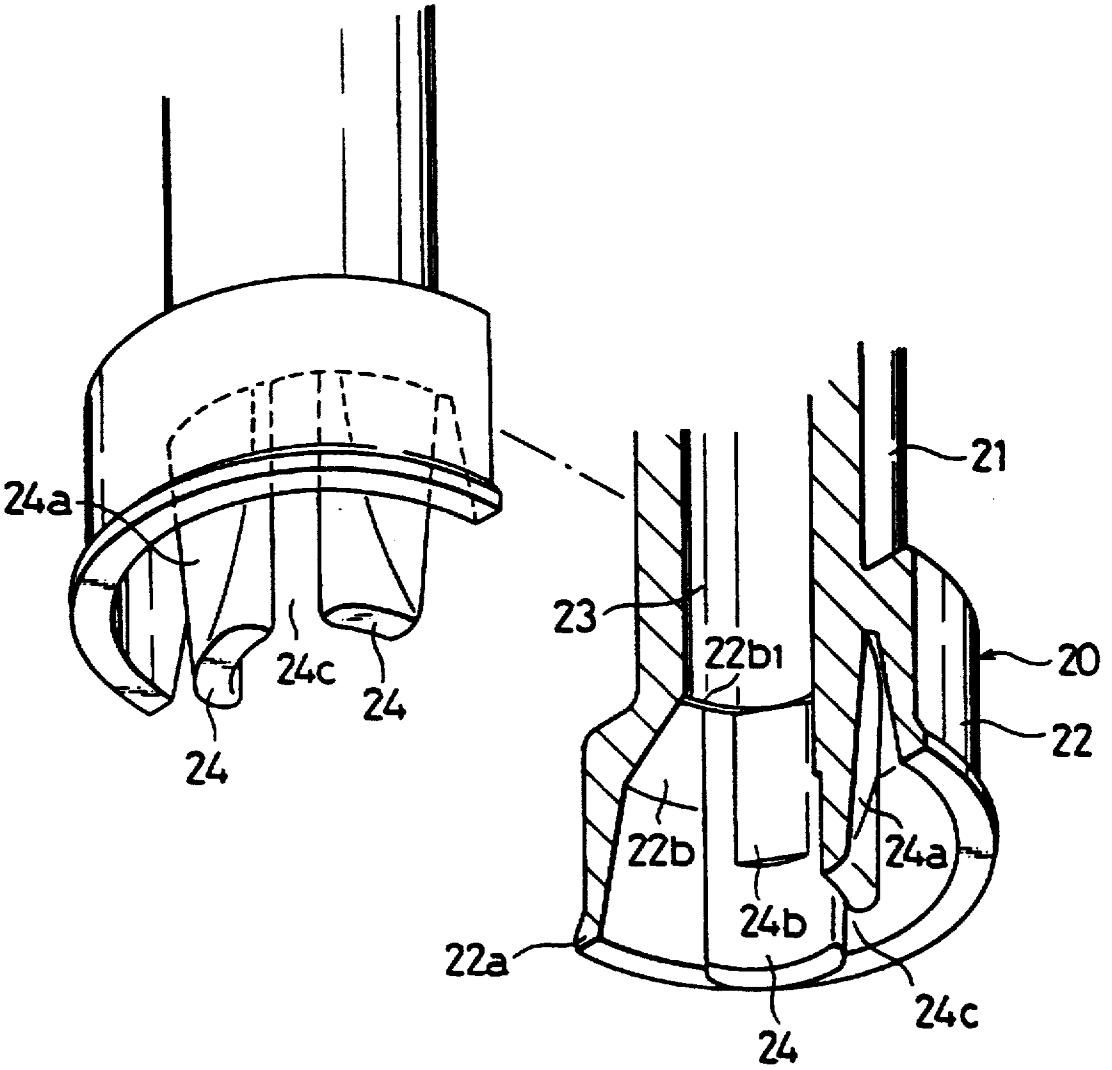
FIG. 3 is an enlarged perspective diagram partially in section showing a first piston of the pump mechanism.
Figure 4:
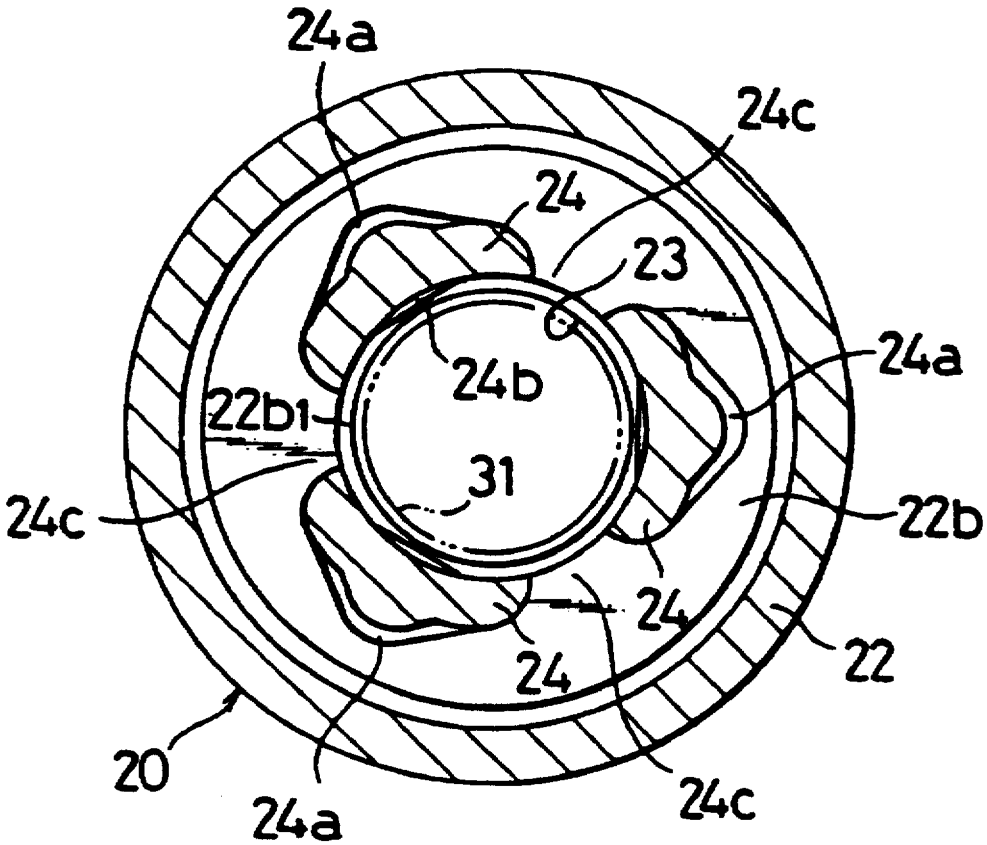
FIG. 4 is an enlarged cross-sectional diagram taken in the direction of arrows along lines X—X of FIG. 2.
Figure 5:
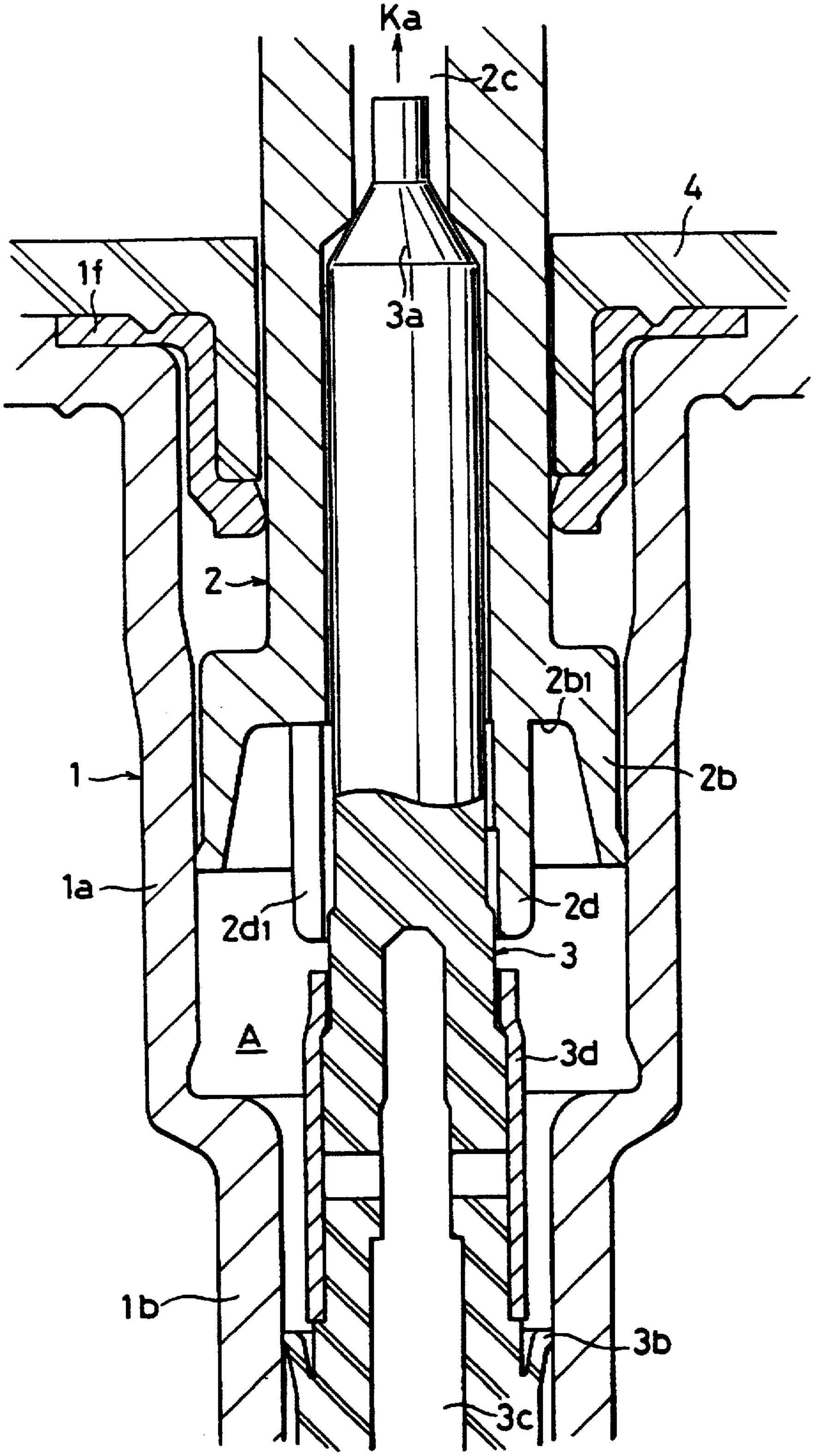
FIG. 5 is a fragmentary cross-sectional diagram corresponding to FIG. 2 illustrating a conventional pump mechanism.

An upper inside surface of the bell-shaped portion 22 forms a guide surface 22*b* inclined upward toward the axial hole 23 as shown in FIGS. 2 and 3. A lower boundary of the guide surface 22*b* connects to a inner surface of the bell-shaped portion 22 while an upper boundary of the guide surface 22*b* connects to the axial hole 23 via a narrow stepped stage 22*b*1. There are formed on the inside of the bell-shaped portion 22 a plurality of guide plates 24 arranged at regular intervals in a cylindrical configuration, the individual guide plates 24 extending downward with slits 24*c* formed between them. Each guide plate 24 has a protuberance 24*a* on its outside surface, while a flat portion 24*b* is formed on its inside surface that extends from about the middle of the height of each guide plate 24 to its upper end, as shown in FIG. 3. Each guide plate 24 has such a cross-sectional shape that its outside surface smoothly curves from outside to inside toward the slits 24*c* on both sides as shown in FIG. 4. Further, the protuberance 24*a* is formed into such a shape that its width and swelling height (thickness) smoothly increase from lower to upper ends of each guide plate 24.

The second piston 30 has in its upper and middle parts a shaft portion 31 and an upward-directed funnel-shaped portion 32, respectively, as shown in FIG. 2. The funnel-shaped portion 32 fits in the small-diameter portion 12 of the stationary cylinder 10, and sealing flange 32*a* formed around an upper end portion of the funnel-shaped portion 32 comes into sliding contact with an inner surface of the small-diameter portion 12. The second piston 30 is installed with its long shaft portion 31 inserted into a lower part of the axial hole 23 in the first piston 20 and its funnel-shaped portion 32 slidably fitted into the small-diameter portion 12 of the stationary cylinder 10.

A downward-opening axial hole 33 is formed within a lower half of the second piston 30, and an upper part of the axial hole 33 is connected to an internal space of the stationary cylinder 10 via a pair of connecting holes 33*a* formed above the funnel-shaped portion 32. These connecting holes 33*a* are usually closed from outside by a tubular nonreturn valve 34 formed of an elastic material, such as rubber. A conical sloping surface 31*a* is formed at an upper part of the shaft portion 31, and a short cylindrical projection 31*a* having a small diameter is formed above the sloping surface 31*a*. Lower ends of the individual guide plates 24 hanging from the first piston 20 are directed face to face with an uppermost end of the nonreturn valve 34 which is fitted over the second piston 30 so that the guide plates 24 serve to prevent the nonreturn valve 34 from coming off its position.

The stationary cylinder 10 is mounted to the mouth 51 of the container 50 by the cap 40, with a packing 15 inserted between the bottom surface of the outward-extending flange 11*a* and the top surface of the mouth 51, and a soft packing 16 inserted between the top surface of the outward-extending flange 11*a* and an upper inside surface of the cap 40. The packing 16 extends downward along an outer surface of the cylindrical sleeve 42, and a lower part of the packing 16 bends inward and comes into sliding contact with an outer surface of the shaft portion 21 of the first piston 20 which passes through the cylindrical sleeve 42. The small-diameter portion 12 incorporates a spring 17 which exerts an upward pushing force on the second piston 30. With this configuration, the axial hole 23 is closed when the conical sloping surface 31*a* on the second piston 30 is brought into contact with the reduced part of the axial hole 23, while the axial hole 23 is opened when the second piston 30 is moved downward relative to the first piston 20 against the pushing force of the spring 17.

The following description related to the operation of the aforementioned liquid ejecting pump mechanism.

The operating nozzle head 60, first piston 20 and second piston 30 are usually kept at their upper home positions as they are forced upward together by the spring 17 (FIG. 1). In this condition, an upper surface of the first piston 20 is pressed against a lower end of the cylindrical sleeve 42 of the cap 40 with the lower part of the packing 16 in between so that the through hole 41 of the cap 40 is closed and the first piston 20 is set in its uppermost position.

When the operating nozzle head 60 is pressed downward (in the direction of arrows K1 shown in FIG. 1) by exerting a force on the finger-operated flanges 61 with fingers, the first piston 20 and second piston 30 move downward together against the pushing force of the spring 17 (FIG. 2). At this point, the axial hole 23 of the first piston 20 is still closed by the sloping surface 31*a* of the second piston 30 and the connecting holes 33*a* are closed by the nonreturn valve 34. A mass of air contained in a metering chamber A, which is formed between the bell-shaped portion 22 of the first piston 20 and the funnel-shaped portion 32 of the second piston 30, is compressed as the first piston 20 moves downward. This develops a high pressure within the metering chamber A, causing the second piston 30 to move downward relative to the first piston 20 (in the direction of an arrow K2 shown in FIG. 2). As a consequence, the second piston 30 moves to open the axial hole 23 and the air within the metering chamber A is released to an outside through the axial hole 23, axial hole 62 and the nozzle chip 64 fitted to the upper end of the operating nozzle head 60.

When the force which has been applied to the operating nozzle head 60 is removed, a restoring force of the spring 17 causes the second piston 30, first piston 20 and operating nozzle head 60 to move upward back to their home positions (FIG. 1). Since a negative pressure is produced inside the metering chamber A at this point, a mass of liquid is sucked from the container 50 into the metering chamber A by way of the suction tube 13, the intake port 12*b* in the stationary cylinder 10, the small-diameter portion 12, axial hole 33 and nonreturn valve 34. Until the upper surface of the bell-shaped portion 22 comes in contact with the lower part of the packing 16 midway in an upward returning stroke of the first piston 20, the through hole 41 in the cap 40 is not completely closed. Therefore, outside air is introduced into the container 50 by way of the through hole 41 and air passage 11*b* while the first piston 20 is returning to its home position.

If the operating nozzle head 60 is pushed again, the pressure of liquid within the metering chamber A increases. This causes the second piston 30 to move down relative to the first piston 20 so that the axial hole 23 is opened. Consequently, the liquid within the metering chamber A is forced toward the operating nozzle head 60 and sprayed to the outside through the nozzle chip 64 while the first piston 20 is pushed downward.

As the liquid within the metering chamber A is ejected, the internal pressure of the metering chamber A reduced and the second piston 30 returns to its upper position, causing the axial hole 23 to be closed. The force applied to the operating nozzle head 60 is removed at his point, allowing the first piston 20 and second piston 30 to return upward to their home positions. As a result, another mass of liquid is sucked from the container 50 into the metering chamber A. It is possible to eject intermittent sprays of the liquid by successively pushing the operating nozzle head 60 thereafter.

When the first piston 20 returns to its upper position, the liquid sucked from the container 50 can easily fill the entire space of the metering chamber A. As previously stated, the guide surface 22*b* inside the bell-shaped portion 22, that forms the upper inside surface of the metering chamber A, is inclined upward toward the axial hole 23. This construction serves to prevent entrapping of air in an upper part of the metering chamber A. When the first piston 20 is forced down by the operating nozzle head 60, the liquid held inside the metering chamber A passes through the slits 24*c* formed between the guide plates 24. The liquid smoothly streams into the axial hole 23 as it flows along the smoothly curved protuberance 24*a* on the outside of the individual guide plates 24. The amount of liquid sprayed by each press of the operating nozzle head 60 is exactly measured by the metering chamber A, and the liquid ejecting pressure during splaying operation can be maintained to a generally constant level.

According to the invention, the operating nozzle head 60 may be constructed in such a way that the nozzle chip 64 produces a rotating flow of liquid as it is being sprayed so that the liquid is ejected in the form of a fine mist. In this embodiment, the guide plates 24 perform two functions: firstly, they act as guide members when inserting the second piston 30 into the first piston 20 and, secondly, they act as a stopper for retaining the nonreturn valve 34. If these functions are not required, the guide plates 24 may be eliminated. In this case, however, there should be made an appropriate arrangement for retaining the nonreturn valve 34 in position. One example of such arrangement is to form a circular groove around the second piston 30 between its connecting holes 33*a* and funnel-shaped portion 32, and a circular ridge which fits in the groove on an inside surface of the nonreturn valve 34.

As described above, a liquid ejecting pump mechanism of the present invention comprises a stationary cylinder whose upper and lower parts form a large-diameter portion and a small-diameter portion, respectively, with an intake port formed in the small-diameter portion, a first piston formed of a hollow cylindrical member whose axial hole is reduced in diameter close to its upper end, a bell-shaped portion being formed around a lower end of the first piston, thereby, the first piston is slidably incorporated in the stationary cylinder with the bell-shaped portion held in sliding contact with an inner surface of the large-diameter portion of the stationary cylinder, a second piston which is incorporated in the stationary cylinder in sliding contact with its inner surface and biased upward by a spring, the second piston serving to open and close the axial hole when moved relative to the first piston in its axial direction, and a nonreturn valve mounted on the second piston, wherein an upper inside wall of the bell-shaped portion of the first piston forms a guide surface which Is inclined upward toward the axial hole.

Accordingly, air will not be entrapped in an upper part of a metering chamber which is formed below the bell-shaped portion because the upper inside wall of the bell-shaped portion constitutes a guide surface inclined toward the axial hole of the first piston. In this configuration, air bubbles which have reached the upper part of the metering chamber are quickly ejected along the guide surface and through the axial hole. This ensures that the amount of liquid is exactly measured by the metering chamber each time the first piston is pressed, minimizing variations in the amount of ejected liquid throughout successive spraying actions.

The guide surface may be inclined straight toward the axial hole, or smoothly curved toward the axial hole.

Also, a plurality of guide plates extending downward are formed at regular intervals in a circular configuration inside the bell-shaped portion of the fist piston. In this configuration, the guide plates make it easy to correctly position the second piston inserted into the axial hole of the first piston. The second piston is inserted into the axial hole from above while the first piston is held upside down so that the axial hole is directed upward.

Further, the individual guide plates have protuberances formed on their outside surfaces. Such protuberances formed on the guide plates effectively regulate the flow of liquid streaming from the metering chamber into the axial hole of the first piston through slits formed between the individual guide plates. This arrangement provides smoother liquid flows, and prevents variations in liquid ejecting pressure during spraying operation.

Further, the guide plates also act as a stopper for retaining the nonreturn valve in position. This arrangement helps prevent deviation of the nonreturn valve from its correct position.

The inventive pump mechanism is suited for a wide variety of liquid ejecting applications in which a liquid is ejected in either a solid stream or a fine mist. Types of liquids that can be handled by the pump mechanism include liquid medicines for nose and throat treatment, liquid cosmetic products, detergent, oil, and so on.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A liquid ejecting pump mechanism comprising:

a stationary cylinder whose upper and lower parts form a large-diameter portion and a small-diameter portion, respectively, with an intake port formed in the small-diameter portion;

a first piston formed of a hollow cylindrical member whose axial hole is reduced in diameter close to its upper end, a bell-shaped portion being formed around a lower end of the first piston, whereby the first piston is slidably incorporated in the stationary cylinder with the bell-shaped portion held in sliding contact with an inner surface of the large-diameter portion of the stationary cylinder;

a second piston which is incorporated in the stationary cylinder in sliding contact with its inner surface and biased upward by a spring, the second piston serving to open and close said axial hole when moved relative to the first piston in its axial direction; and a nonreturn valve mounted on the second piston; wherein an upper inside wall of the bell-shaped portion of the first piston forms a guide surface which is inclined upward toward said axial hole.

2. A liquid ejecting pump mechanism according to claim 1, wherein a plurality of guide plates extending downward are formed at regular intervals in a circular configuration inside the bell-shaped portion of the first piston.

3. A liquid ejecting pump mechanism according to claim 2, wherein a protuberance is formed on an outside surface of each of the guide plates for regulating the flow of liquid.

4. A liquid ejecting pump mechanism according to claim 2, wherein the guide plates also act as a stopper for retaining the nonreturn valve in position.

5. A liquid ejecting pump mechanism according to claim 3, wherein the guide plates also act as a stopper for retaining the nonreturn valve in position.

* * * * *